April 5, 1966   J. S. KURTZ ETAL   3,244,146
POULTRY CAGE DOOR CONSTRUCTION
Filed June 1, 1964   2 Sheets-Sheet 1

INVENTORS
JOHN S. KURTZ
JEWEL GRAVES
BY
ATTORNEYS

April 5, 1966   J. S. KURTZ ETAL   3,244,146
POULTRY CAGE DOOR CONSTRUCTION
Filed June 1, 1964   2 Sheets-Sheet 2

INVENTORS
JOHN S. KURTZ
JEWEL GRAVES
BY
ATTORNEYS

United States Patent Office 3,244,146
Patented Apr. 5, 1966

3,244,146
POULTRY CAGE DOOR CONSTRUCTION
John S. Kurtz, Ephrata, Pa., and Jewel Graves, Holland, Mich., assignors to Big Dutchman, Inc., a corporation of Michigan
Filed June 1, 1964, Ser. No. 371,402
9 Claims. (Cl. 119—17)

This invention relates to poultry cages, and more particularly to a wire-type cage and gate construction.

The gate or door over an access opening in a poultry cage must be conveniently openable as well as inexpensively formable and mountable to be a part of the cage. Yet, normally when simple gate units are made to satisfy these requirements, considerable difficulty is experienced due to the fact that the gates very readily become accidentally opened by movement of the birds themselves. This, of course, is intolerable. Previous efforts to overcome this have resulted in complex cage and gate constructions. Complexity, of course, adds cost and maintenance, as well as preventing simple operation.

It is therefore an object of this invention to provide a poultry cage gate or door construction that cooperates uniquely with the cage structure to completely prevent accidental opening of the gate by the birds themselves. Yet the gate is easily opened by one hand. If furthermore is not complicated so as to be tricky to manipulate. nor is it complex to be subject to breakage and resulting maintenance, or large costs of manufacturing.

Another object of this invention is to provide a poultry cage and gate construction having an inherent interlocking action causing locking of the structure when closed. Yet the gate is formable of mere wire stock like the rest of the cage. A complete gate can be formed on conventional wire bending equipment and readily assembled with the cage structure.

These and several other objects of this invention will become apparent upon studying the following specification in conjunction with the drawings in which.

Referring now specifically to the drawings, the complete cage assembly 10 includes a basic cage structure 12 formed of interconnected wire type elements secured as by soldering at their crossing points. A complete cage forms an internal confinement space 14 for retaining the birds in captive condition. Normally, a plurality of these cages are integrally interconnected to form a cage row, for convenient simultaneous automatic feeding, watering, and egg removal.

Figure 1:
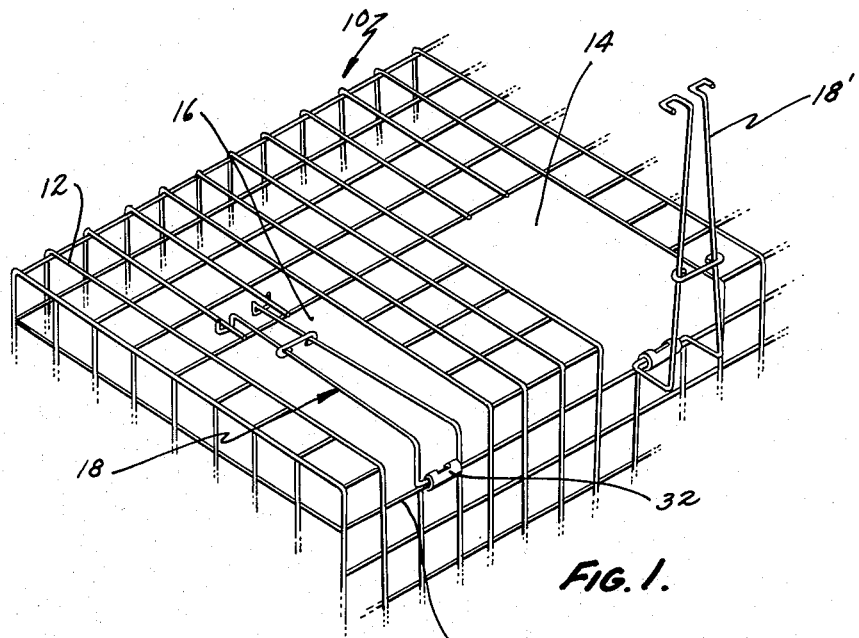
FIG. 1 is a perspective fragmentary view of a poultry cage row showing two of the novel gates interconnected therewith, one open and one closed, and showing the first embodiment of this invention.

Access is had to each of the cages through openings such as opening 16 shown enclosed by gate 18. Normally, each gate encloses the opening of one cage, so that two cages would be represented, in FIG. 1. For convenience, one gate 18 is shown closed, while adjacent gate 18' is shown open.

In this first embodiment of this invention, gate 18 includes a pair of elongated, generally parallel, wire legs 22 and 24 interconnected on one end by a cross leg 26. Preferably, elongated legs 22 and 24 each include a right angle bend to enable opening 16 to extend around the corner of the cage for maximum access convenience. Consequently, the elongated legs 22 and 24 initially extend vertically from across leg 26 and then extend horizontally over a portion of the top of the cage to close opening 16. The cross leg of the gate is pivotally connected to one of the wires 30 at one end of the opening of the cage, by a wrap around collar 32 of suitable construction. This allows the gate to be pivoted between the positions illustrated in FIG. 1.

When the gate is positioned over the opening in the cage, the elongated legs overlap the opposite end of the opening from the cross leg. More specifically the legs extend over edge wire element 36 which is parallel to cross leg 26. The gate rests on this element.

The gate has end hooking portions which interengage with a pair of wires 40 and 42. These wires are interconnected with wire 36, normal thereto, as well as being parallel to each other and generally parallel to legs 22 and 24. Legs 22 and 24 are formed of fairly heavy stock, resilient wire, enabling them to be resiliently deformed convergently or divergently with respect to each other over their length from cross leg 26. Thus the legs can be moved from the position shown in solid lines in FIG. 2 to that shown in phantom lines. At the free ends of the elongated legs, i.e., opposite cross leg 26, is the pair of hooking portions 46 and 48. Each of these, in the first embodiment, comprises generally upright U-shaped elements having a first segment which projects downwardly from the elongated leg, a second segment which projects outwardly and horizontally normal to the elongated leg, and a third segment which projects upwardly parallel to the first segment. These hooking portions can be interengaged with cage wires 40 and 42 after the gate is closed by pressing the elongated legs 22 and 24 toward each other against their inherent resilient bias, and then allowing the legs to spring back under the force of the bias to cause the hooking portions to move beneath and underlie wires 40 and 42.

It has been found that by using this basic construction just described, the poultry have a tendency to press body portions against one or more of the legs in a fashion to cause them to spring out from under these hooking wires. Hence, the gate can be accidentally opened in some instances. To rectify this situation, a unique sliding operator and retaining element 50 was provided of wire stock. This element includes end portions bent around two elongated legs 22 and 24. The unit is slidable along the length of the legs. It stays in a parallel relation with respect to cross leg 26. The element 50 is of a different length than cross leg 26, and is preferably made shorter in length than the cross leg. As it is moved from its position illustrated in solid lines in FIG. 2 to its phantom line position, it pulls the legs toward each other varying amounts. Therefore, it serves also as an operator for the legs. To open the gate, the operator is pushed to the position in phantom lines in FIG. 2. Here it is closer to cross leg 26 to have a greater squeezing effect on the hooking ends of the leg to draw them closer together. This, therefore, retracts the hooking elements from beneath wires 40 and 42 to allow the gate to be lifted.

Figure 2:
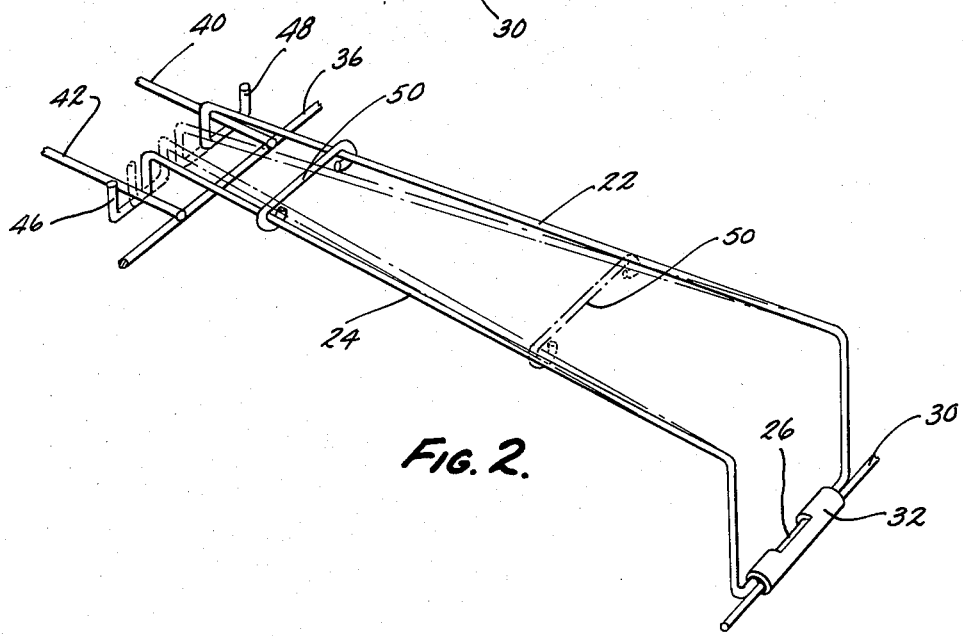
FIG. 2 is an enlarged perspective view of one of the gates in FIG. 1 showing it in two different positions, as the first embodiment of this invention.

When the gate is lowered, wire element 50 is slid to its solid position illustrated in FIG. 2, to force the hooking portions apart and beneath wires 40 and 42. In this position, it also serves its most important function as a lock or holder to prevent the wires from being shifted toward each other. It has been found that this clip effectively prevents the poultry from shifting the legs of the gate together in a manner to release the gate. Any tendency to shift one of the legs merely causes a binding action between the clip and the legs.

Figure 3:
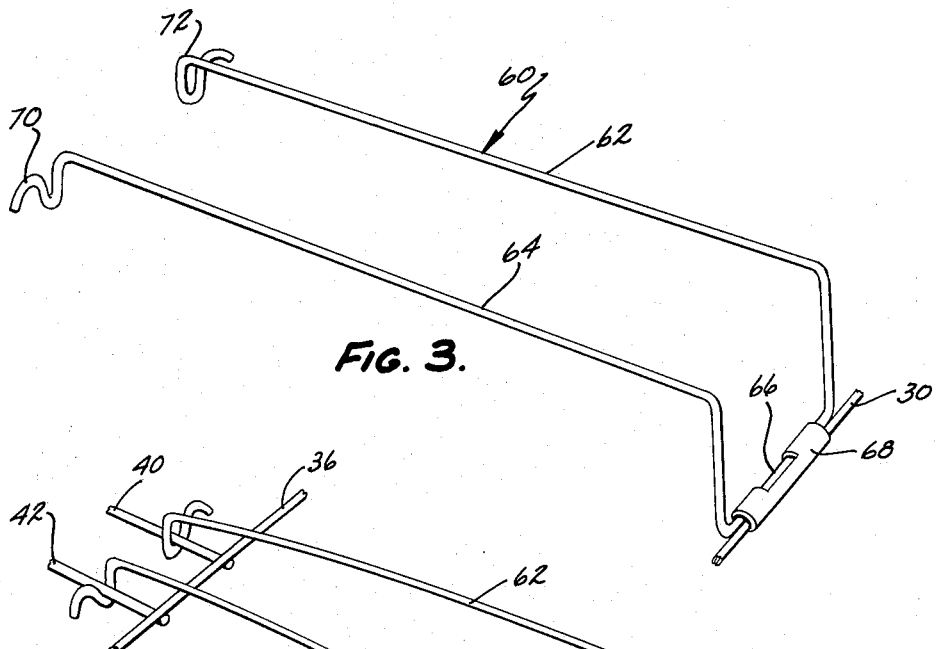
FIG. 3 is an enlarged perspective view of the second embodiment of the novel gate of this invention.
Figure 4:
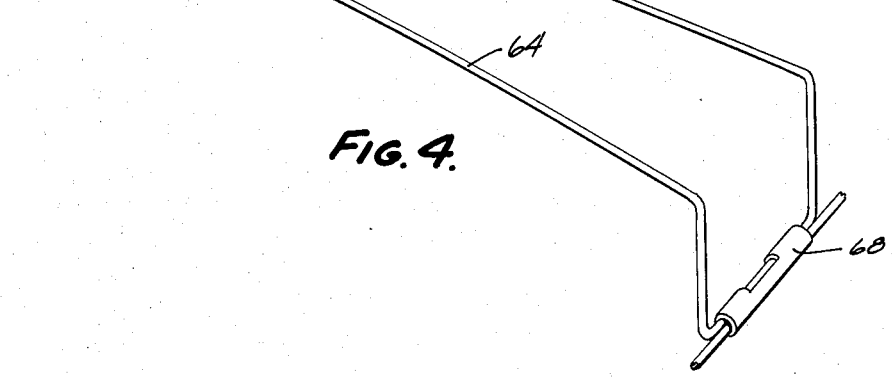
FIG. 4 is a perspective view of the gate in FIG. 3, shown interengaged with a portion of the cage structure.
Figure 5:
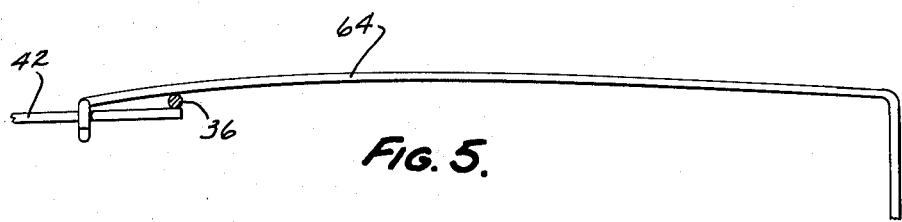
FIG. 5 is a side elevational view of the interengaged structure illustrated in FIG. 4.

A modified form of the device forms the second embodiment of this invention. It is illustrated in FIGS. 3, 4 and 5. This assembly 60 includes two elongated legs 62 and 64 generally parallel to each other, and having a cross leg 66 at one end. The gate is connected by a sleeve or collar 68 with wire 30 of the cage. These elongated legs also preferably include a right angle bend to accommodate closing of the gate around a corner of the cage structure. At the free ends of the legs, opposite cross element 66, modified hooking portions 70 and 72 for legs 64 and 62, respectively, are provided. Hooking portion 72 basically comprises a horizontally positioned S in configuration, while opposite hooking portion 70 resembles a reverse S or mirror image of the first. These extend away from each other generally normal to legs 62 and 64. Each includes a concavity to receive the cage wires but also includes caming portions. The outer end portions of the S have an upper, curved, convexity to serve as a camming element on both sides with respect to wires 40 and 42. The inner curved concavities closest to elongated legs 62 and 64, serve to receive wires 40 and 42 when properly interengaged after the wires snap over the outer convex curves.

The vertical dimension between the gate cross leg and the upper surface of the outer camming curves, is less than the dimension between the cross leg and the upper surface of wire 36 so that, when legs 62 and 64 are resting on cross wire 36, outer curves of the unhooked portions 70 and 72 abut the sides of wires 40 and 42. Therefore, the gate legs cannot expand without force to allow interengagement with wires 40 and 42. Rather, wires 62 and 64, which are normally linear, must be deformed slightly with a vertical arch to the slight curvature illustrated in FIGS. 4 and 5, over wire 36, to allow interengagement. This deformation occurs automatically with forced spreading or divergence of the legs since the outer camming curves of the hooking portions force the hooking portions down beneath wires 40 and 42. Then, after the outer camming concavities pass these wires, the wires snap into position into the inner concavity as illustrated in FIGS. 4 and 5. In this position, the legs are still preferably deformed slightly to form a tight connection. The elongated legs 62 and 64 are thus under a resilient bias tending to return them to their normal linear relationship. The hooking elements are securely held by the interengagement to prevent any accidental release from the closed locked relationship. Yet, they are readily released by manual efforts, merely by squeezing the two legs together to snap the wires out of the concavities. The backsides of the curved camming portions of the hooking means help to cause the leg deformation allowing release.

The device can be readily formed from the same wire stock used to form the cage. It can be formed on conventional wire bending equipment. It is simple and easy to operate. It prevents no complicated structure to increase the expense of the unit. It has no maintenance to speak of since the components are rigid and integral. Yet it serves effectively to retain the closed gate in a locked relationship.

Various additional advantages of either specific modification of the invention may occur to those in the art upon studying the foregoing disclosure in its specific preferred forms. The two modifications have distinct advantages separate from each other as well as having certain characteristics in common. It is conceivable that certain minor changes may be made in the details of the construction while still employing the interlocking principles described and taught herein. Therefore, the invention is to be limited only by the scope of the appended claims and the reasonably equivalent structures to those defined therein, rather than to the specific preferred forms of the invention, in the broader aspects of this concept.

We claim:

1. A poultry cage and gate comprising: a wire type cage having a door opening; a gate over said opening including a pair of elongated legs and a cross leg therebetween; said cross leg being pivotally attached to said cage to allow said elongated legs to be selectively positioned over or away from said opening; said legs, when positioned over said opening, overlying a wire across the edge of said opening opposite said cross leg; transverse hook portions on the ends of said legs, opposite said cross leg, adapted to fit under wire portions of said cage; and said legs being resiliently temporarily deformable with respect to each other and said cross leg to position said hook portions in engagement with said wire portions.

2. A poultry cage and gate comprising: a wire type cage having a door opening; a gate over said opening including a pair of elongated legs and a cross leg therebetween; said cross leg being pivotally attached to said cage to allow said elongated legs to be positioned over said opening; said legs, when so positioned, overlying a wire across the edge of said opening opposite said cross leg; transverse hook portions on the ends of said legs, opposite said cross leg, adapted to fit under wire portions of said cage; said legs being resiliently temporarily deformable with respect to each other and said cross leg to position said hook portions in engagement with said wire portions; an operator element connected to and between said legs parallel to said cross leg; said element having a substantially different length than said cross leg and being slidable along said legs to deform said legs toward and away from each other.

3. A poultry cage and gate comprising: a wire type cage having a door opening; a gate over said opening including a pair of elongated legs and a cross leg therebetween; said cross leg being pivotally attached to said cage to allow said elongated legs to be positioned over said opening; said legs, when so positioned, overlying a wire across the edge of said opening opposite said cross leg; oppositely extending transverse, upwardly hooking portions on the ends of said legs opposite said cross leg, to hook under wire portions of said cage; said legs being deformable with respect to each other; a connecting operator and holder element between said legs, having a length less than that of said cross leg, and having its ends in sliding holding contact around said legs, to deform said legs together, so as to disengage said gate from the cage wires to open it, and to deform said legs apart, so as to engage said gate with the cage wires, upon being slid lengthwise of said legs; and said element holding said legs in the selected position to lock it.

4. A poultry cage gate comprising: a pair of elongated, resilient legs, and a cross leg therebetween; generally U-shaped, outwardly extending hook portions on the ends of said legs opposite said cross leg, to engage with a cage; and a locking bar between said legs, parallel to said cross leg, and movable with repect to said legs, to lock said legs in a particular selected position to prevent movement of said legs.

5. The gate in claim 4 wherein said legs both have right angle bends therein to form a corner gate on a cage.

6. The gate in claim 4 wherein said locking bar is of a different length than said cross leg.

7. A poultry cage gate comprising: a pair of elongated legs interconnected by a cross leg, and being resiliently deformable divergently and convergently with respect to each other; a pair of hook means on the ends of respective ones of said legs, opposite said cross leg; one of said hook means being S-shaped in configuration, and the other being reverse S-shaped, one curve of the S forming a camming section and the other curve forming a hooking section.

8. A poultry cage and gate comprising: a wire type cage having a door opening; a gate over said opening including a pair of elongated legs and a cross leg therebetween; said cross leg being pivotally attached to said cage to allow said elongated legs to be selectively positioned over or away from said opening; said legs, when positioned over said opening, overlying a wire across the edge of said opening opposite said cross leg; oppositely extending hook portions extending transversely from the ends of said legs opposite said cross leg; said hook portions being generally S-shaped and reverse S-shaped in configuration, the outer curve of each hook portion comprising a convex camming means against wire portions of said cage generally parallel to said legs, and the inner curve comprising hooking concavities for said wire portions; said hook portion being oriented toward said wire portions allowing longitudinal deformation of said legs over said edge wire for engagement of said concavities with said wire portions, by contact of said wire portions with said camming means.

9. The gate in claim 8 wherein said legs both have right angle bends therein to form a corner gate on a cage.

References Cited by the Examiner
UNITED STATES PATENTS

| | | | |
|---|---|---|---|
| 986,249 | 3/1911 | Walton | 292—19 |
| 1,656,282 | 1/1928 | Leon | 119—17 |

SAMUEL KOREN, *Primary Examiner.*

HUGH R. CHAMBLEE, *Examiner.*